United States Patent
Ko et al.

(10) Patent No.: US 8,014,351 B2
(45) Date of Patent: Sep. 6, 2011

(54) METHOD AND APPARATUS FOR RECEIVING SYSTEM INFORMATION FROM BASE STATION IN A MOBILE COMMUNICATION SYSTEM

(75) Inventors: Min-Suk Ko, Suwon-si (KR); Kyeong-In Jeong, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 953 days.

(21) Appl. No.: 11/944,102

(22) Filed: Nov. 21, 2007

(65) Prior Publication Data
US 2008/0212522 A1 Sep. 4, 2008

(30) Foreign Application Priority Data
Nov. 21, 2006 (KR) .................. 10-2006-0115082

(51) Int. Cl.
*H04B 7/216* (2006.01)
*H04W 4/00* (2009.01)
(52) U.S. Cl. .................. 370/329; 370/341; 370/350
(58) Field of Classification Search .................. None
See application file for complete search history.

(56) References Cited

U.S. PATENT DOCUMENTS

| | | | | |
|---|---|---|---|---|
| 6,874,113 B2 * | 3/2005 | Chao et al. | ................ | 714/748 |
| 7,657,815 B2 * | 2/2010 | Seidel et al. | ................ | 714/748 |
| 2002/0168985 A1 | 11/2002 | Zhao et al. | | |
| 2004/0166891 A1 | 8/2004 | Mahkonen et al. | | |
| 2004/0202140 A1 | 10/2004 | Kim et al. | | |
| 2006/0126541 A1 * | 6/2006 | Park | ................ | 370/300 |
| 2007/0079207 A1 | 4/2007 | Seidel et al. | | |
| 2007/0111751 A1 * | 5/2007 | Iimori | ................ | 455/550.1 |
| 2007/0260851 A1 * | 11/2007 | Taha et al. | ................ | 712/204 |
| 2008/0039083 A1 * | 2/2008 | Muniere et al. | ................ | 455/434 |
| 2009/0253422 A1 * | 10/2009 | Fischer | ................ | 455/418 |
| 2010/0234034 A1 * | 9/2010 | Aoyama et al. | ................ | 455/450 |

FOREIGN PATENT DOCUMENTS

| | | |
|---|---|---|
| KR | 1020060060766 | 6/2006 |
| KR | 1020060081402 | 7/2006 |
| RU | 2 229 174 | 5/2004 |
| WO | WO 2005/109730 | 11/2005 |

* cited by examiner

*Primary Examiner* — Chi H Pham
*Assistant Examiner* — Soon-Dong D Hyun
(74) *Attorney, Agent, or Firm* — The Farrell Law Firm, P.C.

(57) ABSTRACT

A method and apparatus for receiving system information from a Base Station (BS) in a Mobile Station (MS) in a mobile communication system are provided, in which it is determined whether there is buffered system information in a buffer, if current system information has an error, it is determined whether a combining condition is satisfied, in the presence of the buffered system information, the combining condition being defined by at least one of a Master Information Block (MIB) value tag, a System Information Block (SIB) value tag, and modification time information that are associated with the current system information, and the current system information is combined with the buffered system information, if the combining condition is satisfied.

16 Claims, 10 Drawing Sheets

METHOD AND APPARATUS FOR RECEIVING SYSTEM INFORMATION FROM BASE STATION IN A MOBILE COMMUNICATION SYSTEM

PRIORITY

This application claims priority under 35 U.S.C. §119(a) to a Korean Patent Application filed in the Korean Intellectual Property Office on Nov. 21, 2006 and assigned Serial No. 2006-115082, the contents of which are hereby incorporated herein by reference.

BACKGROUND OF THE INVENTION

1. Field of the Invention

The present invention relates generally to a mobile communication system, and more particularly, to a method and apparatus for receiving system information from a Base Station (BS) in a Mobile Station (MS) in a mobile communication system.

2. Description of the Related Art

In a mobile communication system, a BS transmits to an MS system information, which refers to various pieces of information required for communications between the BS and the MS, including information for channel establishment and a list of neighbor cells. The system information is carried in System Information Blocks (SIBs), generally 18 SIBs.

The BS can use one of two methods to notify the MS of a change in the system information, i.e. a change in the SIBs. In one of the methods, the BS periodically transmits a Master Information Block (MIB) and the MS monitors the MIB. The MIB transmission period is equal to the monitoring period. The MIB, which provides information required for transmission of the SIBs, includes information bits called an MIB value tag and SIB value tags. The MIB value tag indicates whether the system information has been changed and the SIB value tags indicate an SIB that has been changed.

The MIB or the SIBs can be broadcast on a Broadcast Control CHannel (BCCH).

In this method, the MS monitors the system information in the same period as the transmission period of the system information of the BS. Therefore, when the system information is changed, modification time information is not needed. The modification time information indicates a time when the changed system information is applied.

The other method is that the BS notifies the MS of a change in the system information when the change occurs, rather than periodically. This method requires the modification time information.

A brief description will now be made of how it is determined whether the system information has been changed by use of the value tags. The following description applies to both the methods.

If a first MIB value tag is 0 and a second MIB value tag is 0, this indicates that no change has occurred to the system information. If an SIB is changed, the MIB value tag is set to 1, to thereby notify the MS of a change in the system information. Each time the system information changes, the MIB value tag sequentially increases. The MIB value tag just notifies the MS of whether the system information has been changed, and does not indicate the changed system information. Hence, when receiving a different MIB value tag compared to the previous one, the MS identifies the changed system information by checking SIB value tags.

If the MIB value tag is changed to 1 in the above example, the MS determines that the system information has been changed. To find out the changed system information, the MS then reads each of the 18 SIB value tags and acquires the changed system information from an SIB corresponding to a changed SIB value tag.

FIG. 1 illustrates a signal flow for a conventional operation for receiving system information from an Evolved Radio Access Network (E-RAN) in a User Equipment (UE) in a mobile communication system.

Referring to FIG. 1, in the mobile communication system, an E-RAN 100 transmits an MIB with an MIB value tag to a UE 110 in step 120 and an SIB to the UE 110 in step 130. It is assumed that the MIB value tag is error-free and has an increased value and thus the UE 110 has read SIB value tags. To determine a changed SIB using a changed SIB value tag, the UE 110 checks an error in the received SIB in step 140. If the SIB has an error, the UE 110 neglects the SIB in step 150 and receives a new SIB in step 160. For the sake of convenience, a description of MIB transmission is not provided herein.

In step 170, the UE 110 checks errors in the SIB. If no errors are detected, the UE 110 buffers the SIB in a buffer in step 180. If an error is detected in the received SIB, the UE 110 neglects the SIB and repeats SIB reception until no errors are detected in the procedure of FIG. 1. The repetition causes a long time delay for the UE to receive normal SIBs and determine the changed system information. As a consequence, communications are delayed between the E-RAN and the UE.

SUMMARY OF THE INVENTION

An aspect of the present invention is to address at least the problems and/or disadvantages and to provide at least the advantages described below. Accordingly, an aspect of the present invention is to provide a method and apparatus for receiving system information without errors in a UE.

Another aspect of the present invention is to provide a method and apparatus for increasing the reception rate of system information in a UE.

A further aspect of the present invention is to provide a method and apparatus for reducing the time delay of receiving system information in a UE.

In accordance with the present invention, there is provided a method for receiving system information from a BS in an MS in a mobile communication system, in which it is determined whether there is buffered system information in a buffer, if current system information has an error, it is determined whether a combining condition is satisfied, in the presence of the buffered system information, the combining condition being defined by at least one of an MIB value tag, an SIB value tag, and modification time information that are associated with the current system information, and the current system information is combined with the buffered system information, if the combining condition is satisfied.

In accordance with the present invention, there is provided an apparatus for receiving system information from a BS in an MS in a mobile communication system, in which a receiver receives system information and at least one of an MIB value tag, an SIB value tag, and modification time information that are associated with the system information, an error checker checks errors in the received system information and outputs an error check result, a controller provides the system information to one of a buffer and a combiner according to whether a combining condition or a buffering condition is satisfied based on the error check result, the combining condition and the buffering condition being defined by at least one of the MIB value tag, the SIB value tag, and the modification time information, the buffer buffers the system information received from the controller, if the buffering condition is satisfied, and the combiner combines system information buffered in the buffer with the system information received from the controller, if the combining condition is satisfied.

BRIEF DESCRIPTION OF THE DRAWINGS

The above and other objects, features and advantages of preferred embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

The present invention increases the reception success rate of SIBs by combining a previously stored SIB with a received SIB according to a combining condition that is defined by an MIB value tag, a modification time and an SIB value tag. Compared to the conventional technology, SIB value tags can be transmitted together with an MIB value tag or separately from the MIB value tag in the present invention. As previously described, one of the two methods for receiving system information in the UE requires the modification time information, whereas the other method does not require the modification time information. The present invention is applicable to the two cases.

Figure 1:
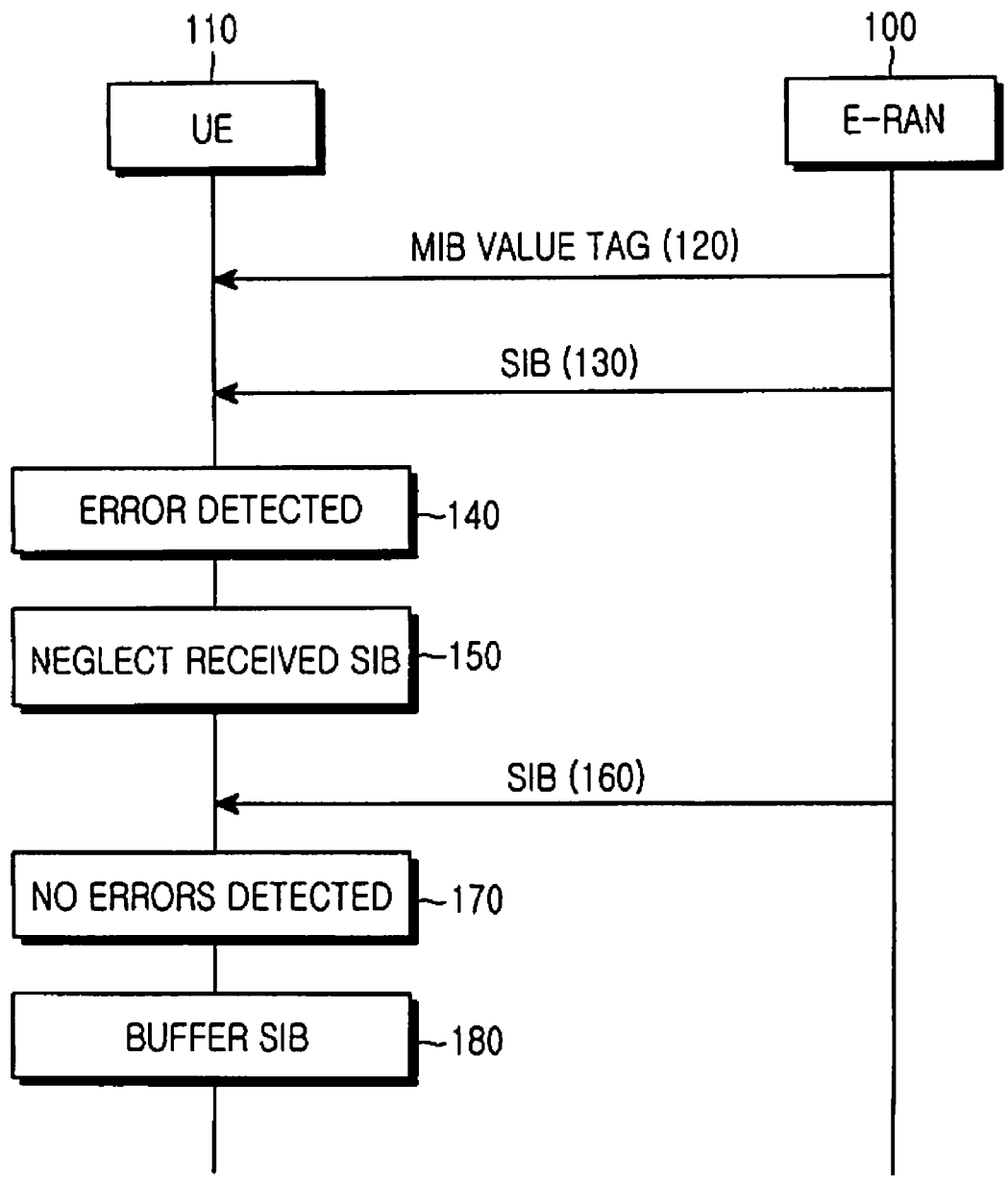
FIG. 1 illustrates a signal flow for a conventional operation for receiving system information from an E-RAN in a UE in a mobile communication system.
Figure 2:
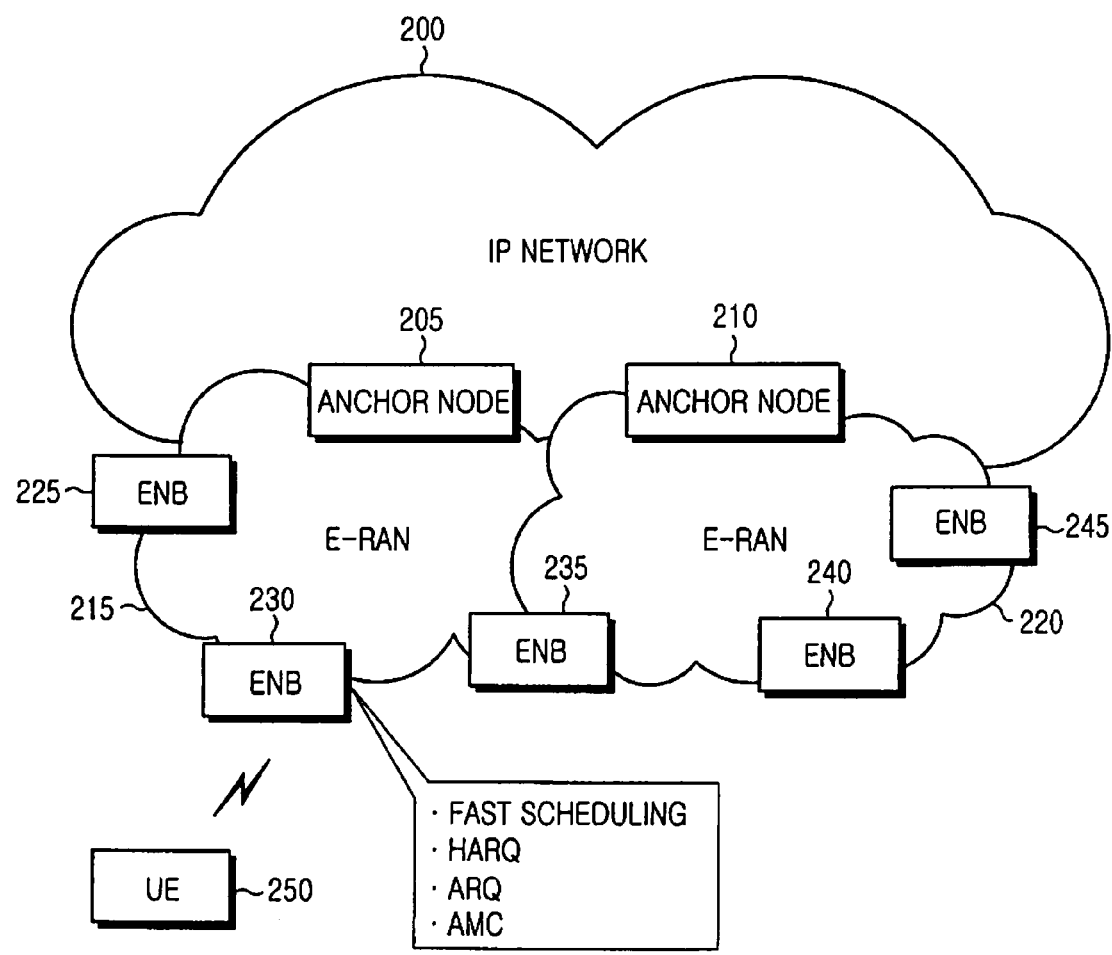
FIG. 2 illustrates the configuration of a mobile communication system according to the present invention.

FIG. 2 illustrates a mobile communication system according to the present invention.

Referring to FIG. 2, an E-RAN 215 is configured in a simple structure having Evolved Node Bs (ENBs) 225, 230, 235, 240 and 245 and anchor nodes 205 and 210. A UE 250 accesses an Internet Protocol (IP) network via the E-RAN 215. The ENBs 225 to 245 are connected wirelessly to the UE 250. Since all user traffic including real-time services such as Voice over IP (VoIP) is serviced on a shared channel, the ENBs 225 to 245 collect the status information of UEs and schedule them, for reliable information transmission/reception.

Typically, one ENB controls a plurality of cells. The ENB performs Adaptive Modulating and Coding (AMC) that determines a modulation scheme and a channel coding rate for a UE adaptively according to the channel status of the UE. Hybrid Automatic Repeat reQuest (HARQ) is carried out between the ENBs 225 to 245 and the UE 250. Because HARQ alone has limitations in satisfying different Quality of Service (QoS) requirements, an outer ARQ is performed between the UE 250 and the ENBs 225 to 245 in an upper layer.

HARQ increases a reception success rate by soft-combining previous received data with retransmitted data without discarding the previous received data. HARQ is adopted to achieve high transmission efficiency in high-speed packet communications such as High Speed Downlink Packet Access (HSDPA) and Enhanced Dedicated CHannel (EDCH).

Figure 3:
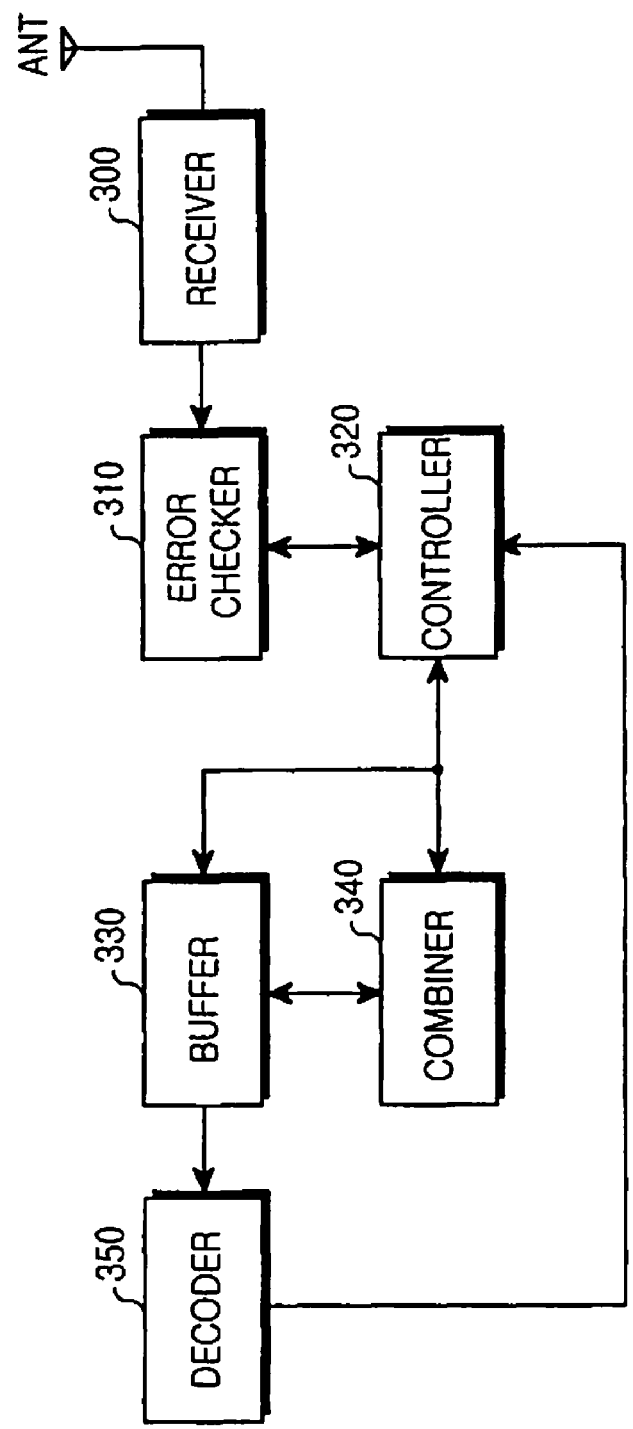
FIG. 3 illustrates a UE for receiving an SIB according to the present invention.

FIG. 3 illustrates a UE for receiving SIBs according to the present invention.

Referring to FIG. 3, a receiver 300 receives an SIB from the ENB 230. An error checker 310 checks errors in the received SIB by, for example, a Cyclic Redundancy Check (CRC). A controller 320 provides the SIB to a buffer 330 or a combiner 340 according to a condition defined by an MIB value tag, an SIB value tag, and a modification time that are associated with the SIB. The condition will be detailed later herein.

The buffer 330 buffers the received SIB or a combined SIB and provides a buffered SIB to the combiner 340 and the received SIB or the combined SIB to a decoder 350 according to commands received from the controller 320. The combiner 340 combines the received SIB with the buffered SIB and provides the combined SIB to the buffer 330. The decoder 350 decodes the received SIB without errors or the combined SIB and provides the decoded SIB to the controller 320.

Figure 4:
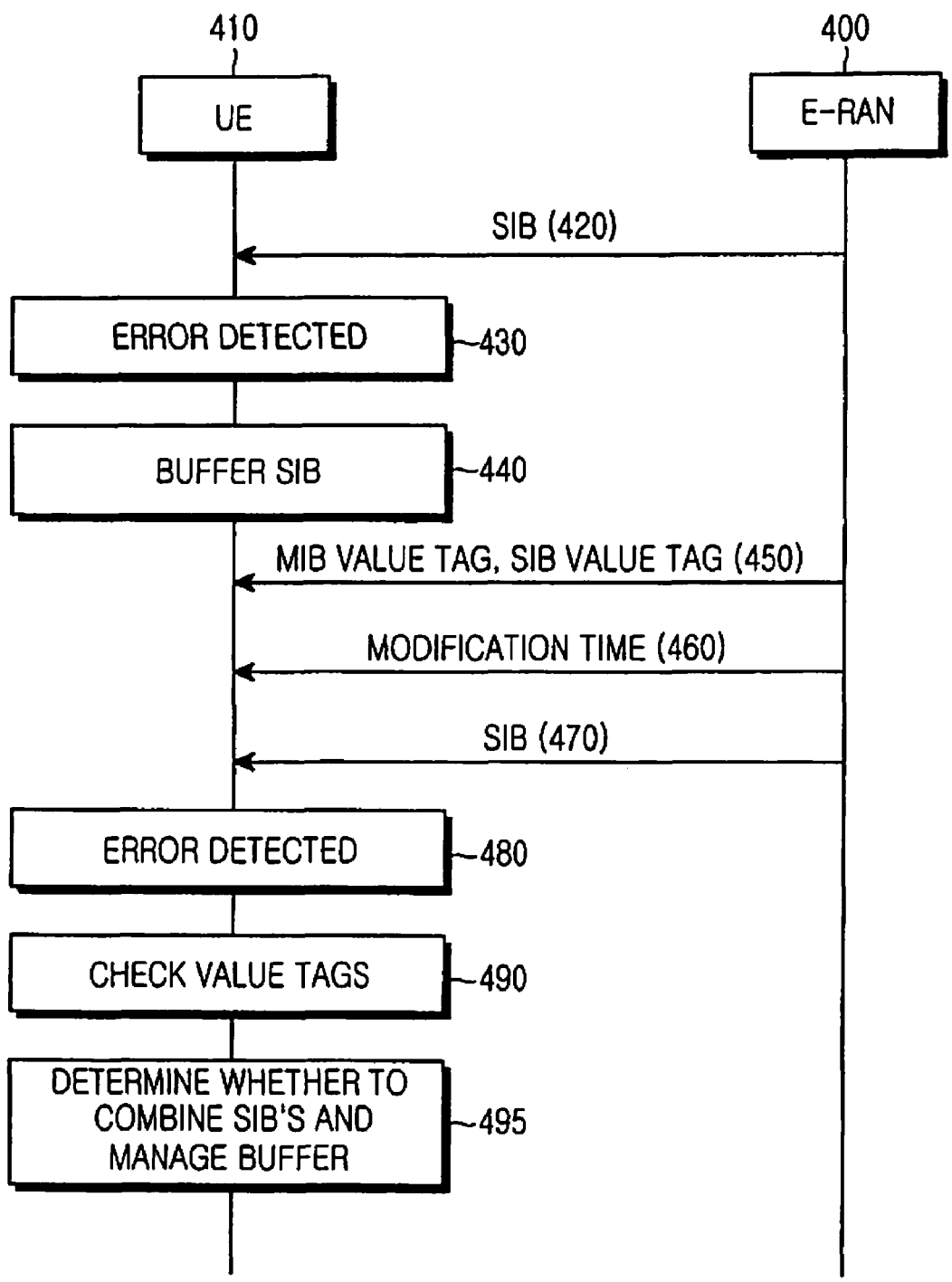
FIG. 4 illustrates a signal flow for an operation for receiving an SIB in the UE according to the present invention.

FIG. 4 illustrates a signal flow for an operation for receiving an SIB in the UE according to the present invention.

Referring to FIG. 4, on the assumption that a UE 410 has received a changed MIB value tag and thus checked SIB value tags, the UE 410 receives an SIB from an E-RAN 400 in step 420. Since the MIB value tag has an increased value, the UE 410 should acquire changed system information from an SIB corresponding to a changed SIB value tag. Hence, the UE 410 checks errors in the received SIB in step 430. If the SIB has an error, the UE 410 buffers the SIB in the buffer 330 in step 440. This SIB is referred to as a buffered SIB. The UE 410 also stores the MIB value tag and the SIB value tags in the buffer 330 or any other storage (not shown). In step 450, the UE 410 receives an MIB value tag and SIB value tags at the next scheduling time. It is assumed that the UE 410 receives modification time information in step 460.

In step 470, the UE 410 receives an SIB. While the MIB value tag, the SIB value tags and the modification time information are received in separate steps, they can be received together. The UE 410 performs an error check on the received SIB in step 480. If the SIB has an error, the UE 410 compares at least one of the stored MIB value tag and SIB value tags with the received MIB value tag, SIB value tags, and modification time information. The UE 410 determines whether to combine or buffer the received SIB according to a combining condition after the comparison in step 495. The combining condition is defined according to whether the received MIB value tag has been changed, the received SIB value tags have been changed, and the UE receives the modification time information.

For better understanding of the present invention, the preferred embodiments of the present invention are classified according to the following two criteria.

(1) The preferred embodiments of the present invention are divided depending on whether the UE receives modification time information. The instance when the UE does not receive modification time information will be described with reference to FIGS. 5, 6 and 9. The instance when the UE receives modification time information will be described with reference to FIGS. 7 and 10.

(2) The preferred embodiments of the present invention are divided depending on whether the UE receives an SIB earlier than an SIB value tag. The instance when the UE receives an SIB later than an SIB value tag will be described with reference to FIGS. 5, 6 and 7. The instance when the UE receives an SIB earlier than an SIB value tag will be described with reference to FIGS. 9 and 10.

Unlike the conventional technology, the UE can receive an SIB earlier than an SIB value tag in the present invention. The present invention is not limited to the instance when an SIB value tag is transmitted together with an MIB value tag in an MIB. That is, the SIB value tag can be transmitted separately from the MIB value tag depending on system configuration.

Figure 5:
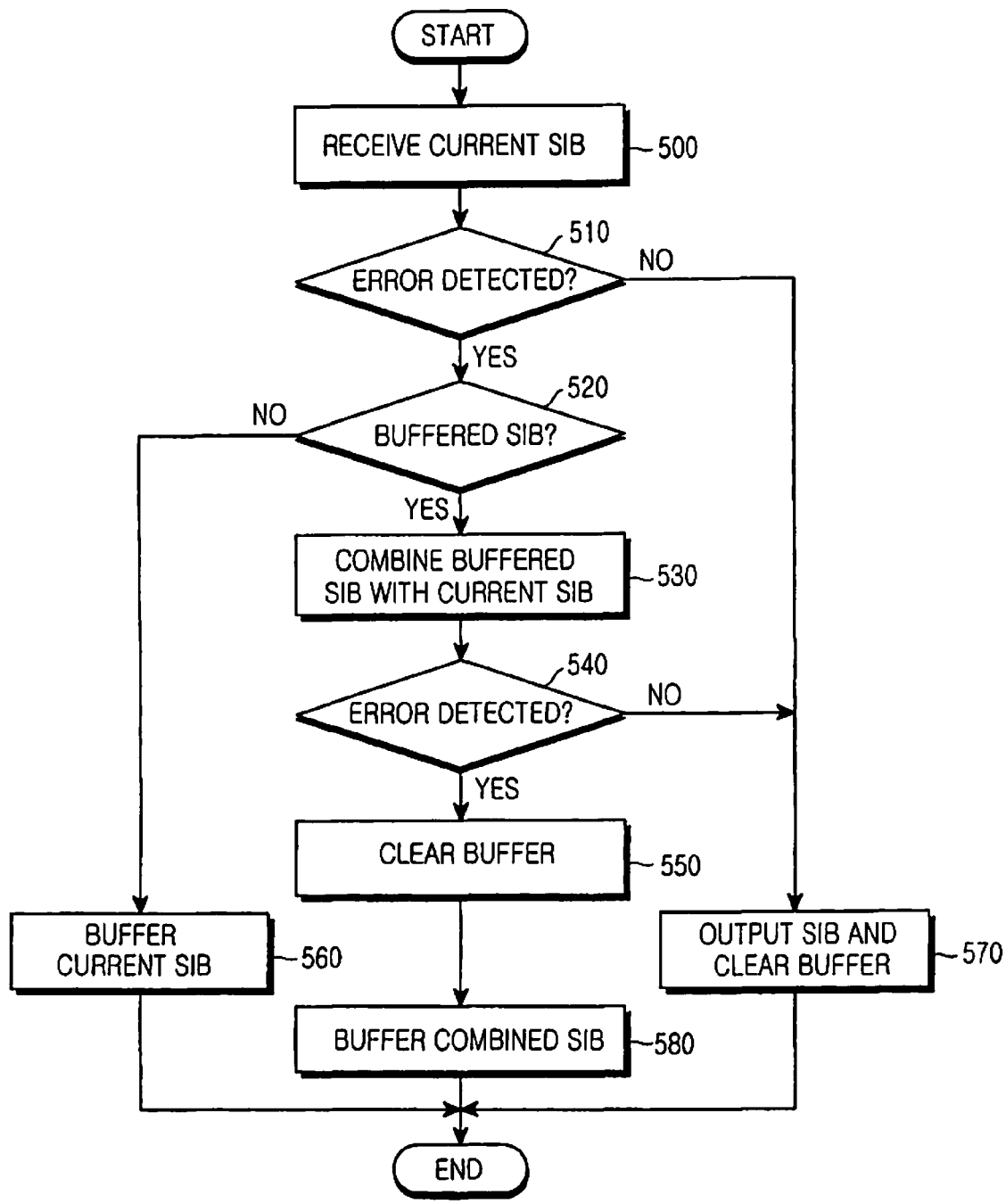
FIG. 5 illustrates an operation for receiving an SIB in the UE according to a first embodiment of the present invention.
Figure 6:
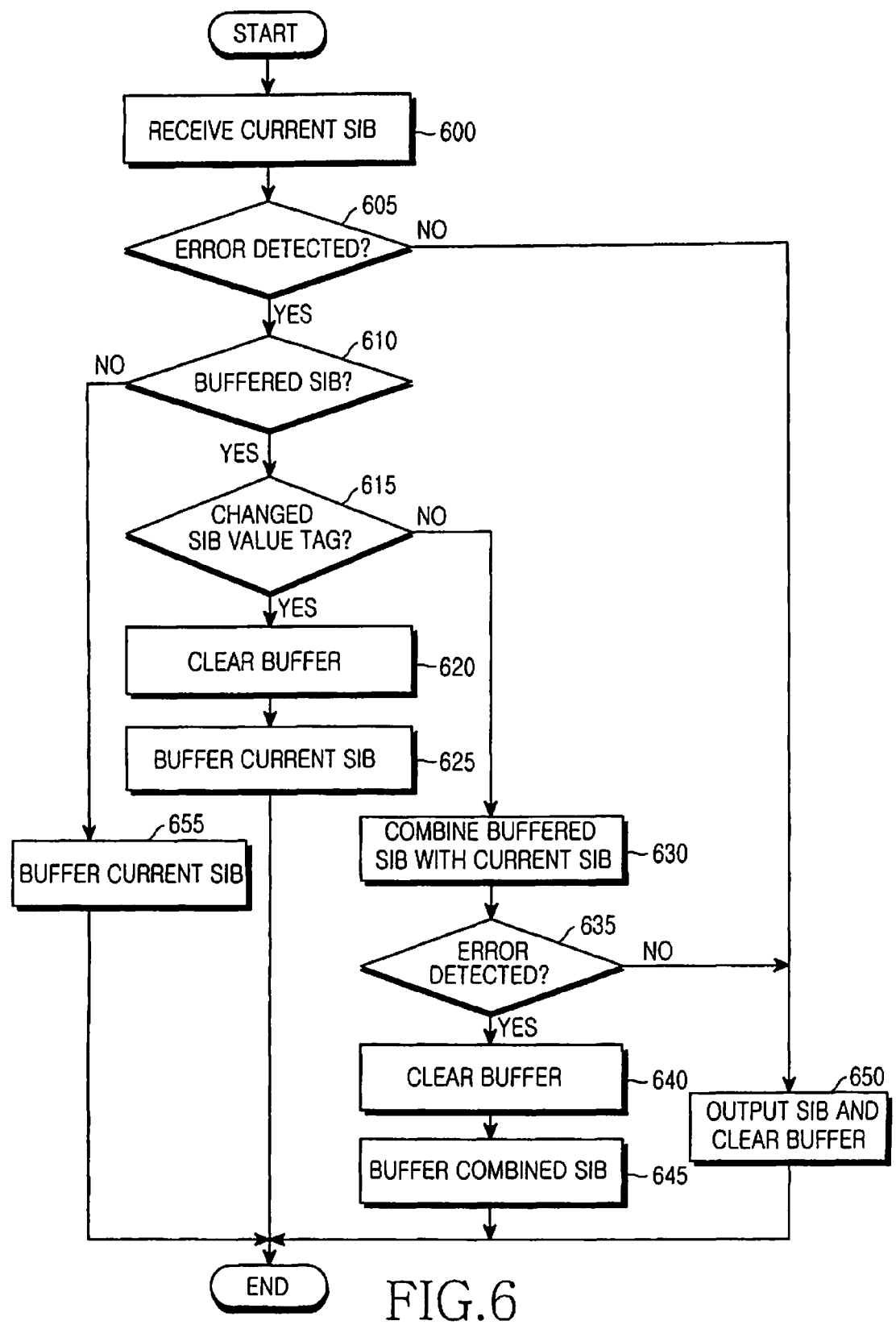
FIG. 6 illustrates an operation for receiving an SIB in the UE according to a second embodiment of the present invention.
Figure 7:
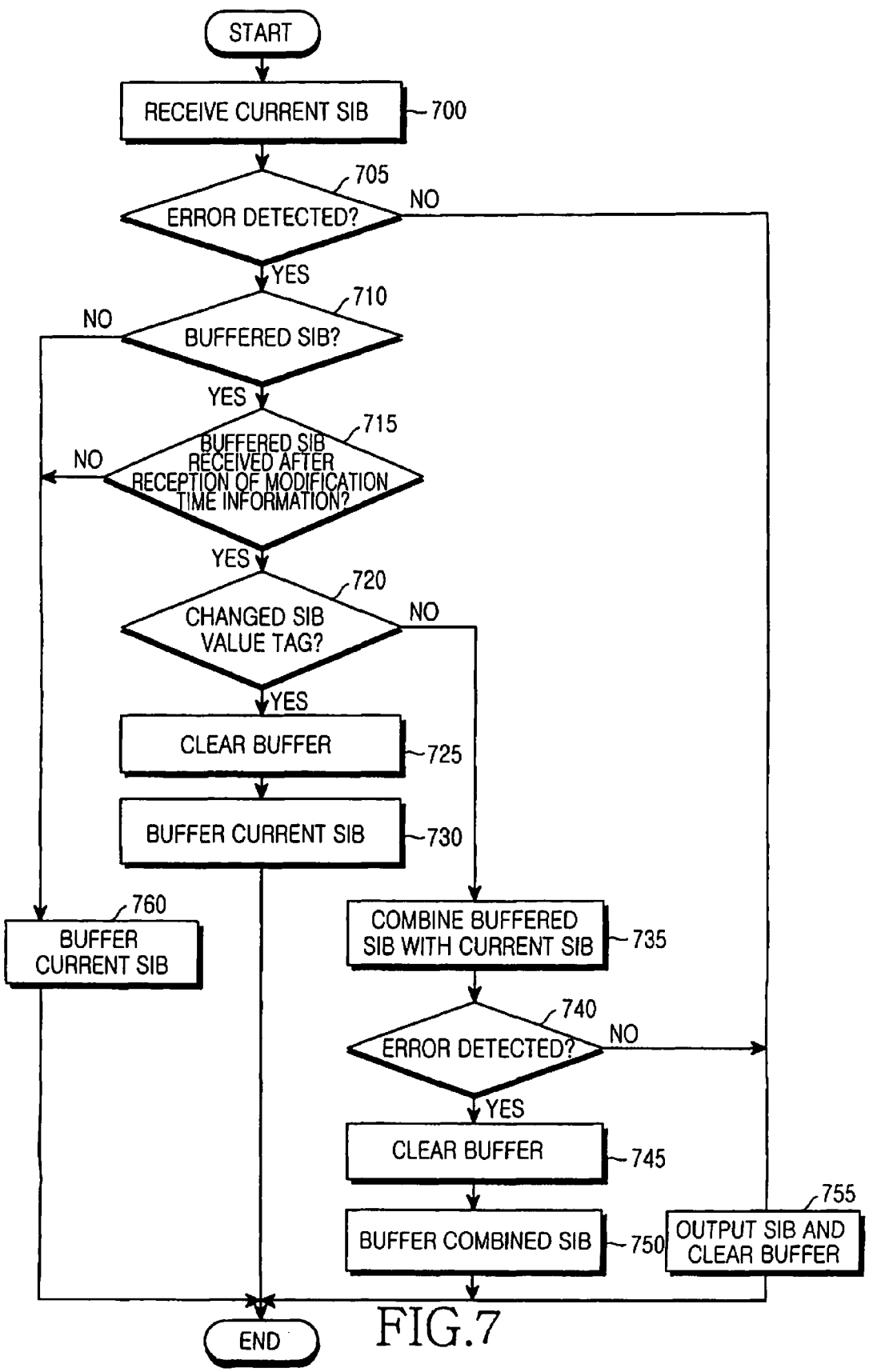
FIG. 7 illustrates an operation for receiving an SIB in the UE according to a third embodiment of the present invention.

FIGS. 5, 6 and 7 illustrate preferred embodiments of the present invention in which the UE receives an SIB according to a combining condition.

FIG. 5 illustrates an operation for receiving an SIB in the UE according to a first embodiment of the present invention.

Combining condition 1 for the procedure of FIG. 5 is that when the UE does not receive modification time information, the latest received MIB value tag (i.e., a current MIB value tag) has the same value as a stored MIB value tag (i.e., a buffered MIB value tag). Since the MIB value tag has not been changed, current SIB value tags are identical to buffered SIB value tags. Therefore, the combining condition does not involve the SIB value tags.

Referring to FIG. 5, the UE receives a current SIB in step 500 and checks for errors in the current SIB in step 510. When the current SIB has an error, the UE proceeds to step 520 and if the current SIB has no errors, the UE jumps to step 570.

Since the current SIB is error-free, it can be applied to the UE immediately in step 570. Hence, the current SIB is directly output, without being buffered in the buffer.

In step 520, the UE determines whether there is a buffered SIB in the buffer. In the absence of a buffered SIB, the UE buffers the current SIB in the buffer because the current SIB is the latest SIB in step 560.

In the presence of a buffered SIB, the UE combines the buffered SIB with the current SIB in step 530 and checks for errors in the combined SIB in step 540. If the combined SIB has no errors, the UE outputs the combined SIB without buffering it in step 570. If the combined SIB has an error, the UE clears the buffer in step 550 and buffers the combined SIB in the buffer in step 580.

FIG. 6 illustrates an operation for receiving an SIB in the UE according to a second embodiment of the present invention.

Combining condition 2 for the procedure of FIG. 6 is that when the UE does not receive modification time information, a current MIB value tag has a different value from that of a buffered MIB value tag and a current SIB value tag has the same value as a buffered SIB value tag.

Referring to FIG. 6, the UE receives a current SIB in step 600 and checks for errors in the current SIB in step 605. When the current SIB has an error, the UE proceeds to step 610 and if the current SIB has no errors, the UE jumps to step 650.

Since the current SIB is error-free, it can be applied to the UE immediately in step 650. Hence, the current SIB is directly output, without being buffered in the buffer.

In step 610, the UE determines whether there is a buffered SIB in the buffer. In the absence of a buffered SIB, the UE buffers the current SIB in the buffer because the current SIB is the latest SIB in step 655.

In the presence of a buffer SIB, the UE compares a current SIB value tag with a buffered SIB value tag in step 615. If the two SIB value tags are different, the UE clears the buffered SIB from the buffer in step 620 and buffers the current SIB in the buffer since the current SIB is the latest SIB in step 625.

If the two SIB value tags are identical, the UE combines the current SIB with the buffered SIB in step 630 and checks for errors in the combined SIB in step 635. If no errors are detected from the combined SIB, the UE outputs the combined SIB without buffering it in step 650. If an error is detected in the combined SIB, the UE clears the buffered SIB from the buffer in step 640 and buffers the combined SIB in step 645.

FIG. 7 illustrates an operation for receiving an SIB in the UE according to a third exemplary embodiment of the present invention.

Combining condition 3 for the procedure of FIG. 7 is that when the UE receives modification time information, a current MIB value tag has a different value from that of a buffered MIB value tag, a buffered SIB is received after a modification time, and a current SIB value tag has the same value as a buffered SIB value tag.

Referring to FIG. 7, the UE receives a current SIB in step 700 and checks for errors in the current SIB in step 705. When the current SIB has an error, the UE proceeds to step 710 and if the current SIB has no errors, the UE jumps to step 755.

Since the current SIB is error-free, it can be applied to the UE immediately. Hence, the current SIB is directly output, without being buffered in the buffer in step 755.

In step 710, the UE determines whether there is a buffered SIB in the buffer. In the presence of a buffered SIB, the UE proceeds to step 715 and in the absence of a buffered SIB, the UE proceeds to step 760. In step 760, since the buffered SIB does not exist in the buffer or was received before the modification time, the UE buffers the current SIB being the latest SIB in the buffer. If the current SIB has been received before the modification time information, this indicates that the current SIB is not the latest SIB.

In step 715, the UE determines whether the buffered SIB was received after the modification time. If the buffered SIB was received before the modification time, the UE proceeds to step 760. If the buffered SIB was received after the modification time, the UE compares a current SIB value tag with a buffered SIB value tag in step 720. If the two SIB value tags are different, the UE clears the buffered SIB from the buffer in step 725 and buffers the received SIB in the buffer since the current SIB is the latest SIB in step 730.

If the two SIB value tags are identical, the UE combines the current SIB with the buffered SIB in step 735 and checks for errors in the combined SIB in step 740. If no errors are detected from the combined SIB, the UE outputs the combined SIB without buffering it in step 755. If an error is detected in the combined SIB, the UE clears the buffered SIB from the buffer in step 745 and buffers the combined SIB in step 750.

The embodiments depicted in FIGS. 5, 6 and 7 concern instances when the UE receives an MIB value tag and an SIB value tag before receiving an SIB. As previously stated, the UE can receive the SIB value tag separately from the MIB value tag. Hence, it may occur that the UE receives an SIB before the SIB value tag, which is illustrated in FIG. 8.

Figure 8:
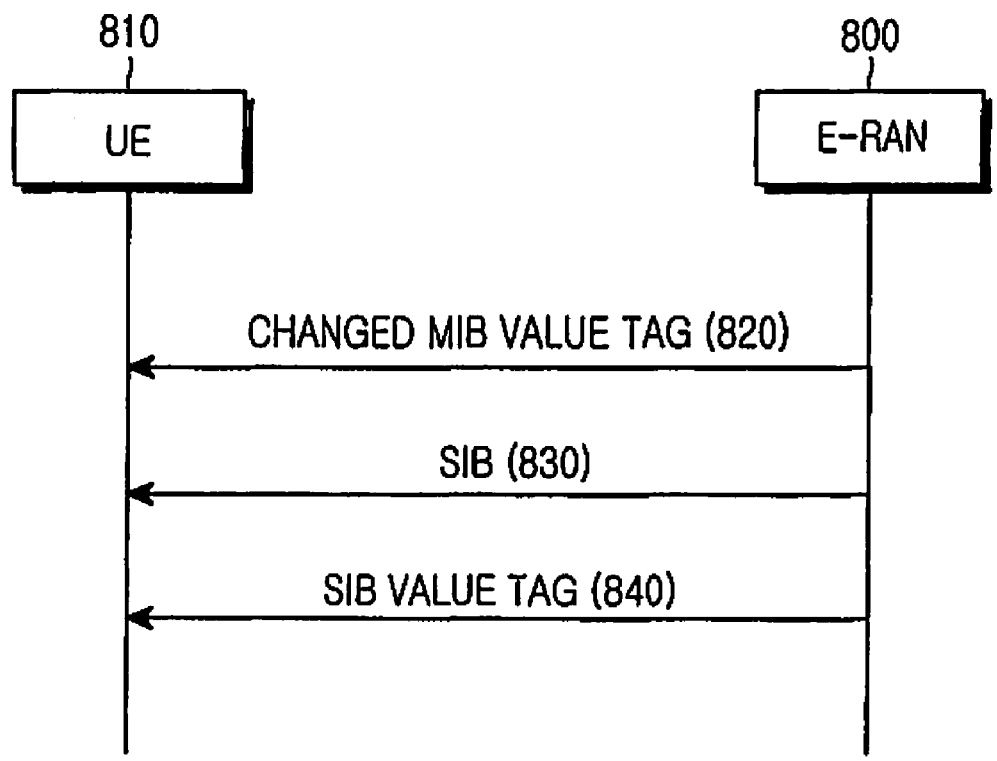
FIG. 8 illustrates a signal flow for an operation for receiving an SIB earlier than an SIB value tag in the UE according to the present invention.

FIG. 8 illustrates a signal flow for an operation for receiving an SIB earlier than an SIB value tag in the UE according to the present invention.

Referring to FIG. 8, a UE 810 receives a changed MIB value tag from an E-RAN 800 and thus is aware of a change in an SIB in step 820. Thus, the UE 810 receives a new SIB in step 830 and receives an SIB value tag after the SIB reception in step 840.

Figure 9:
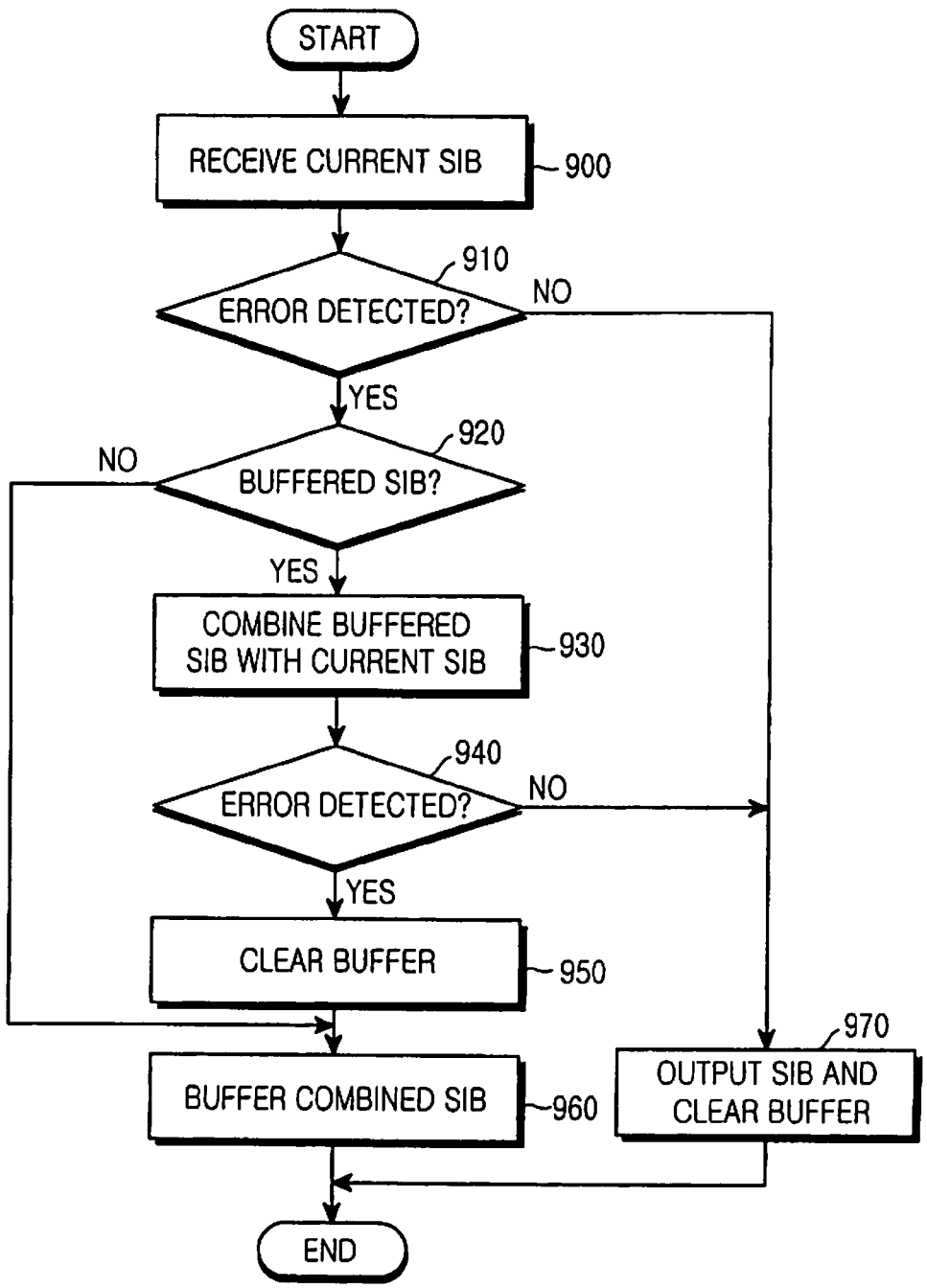
FIG. 9 illustrates an operation for receiving an SIB in the UE according to a fourth embodiment of the present invention.
Figure 10:
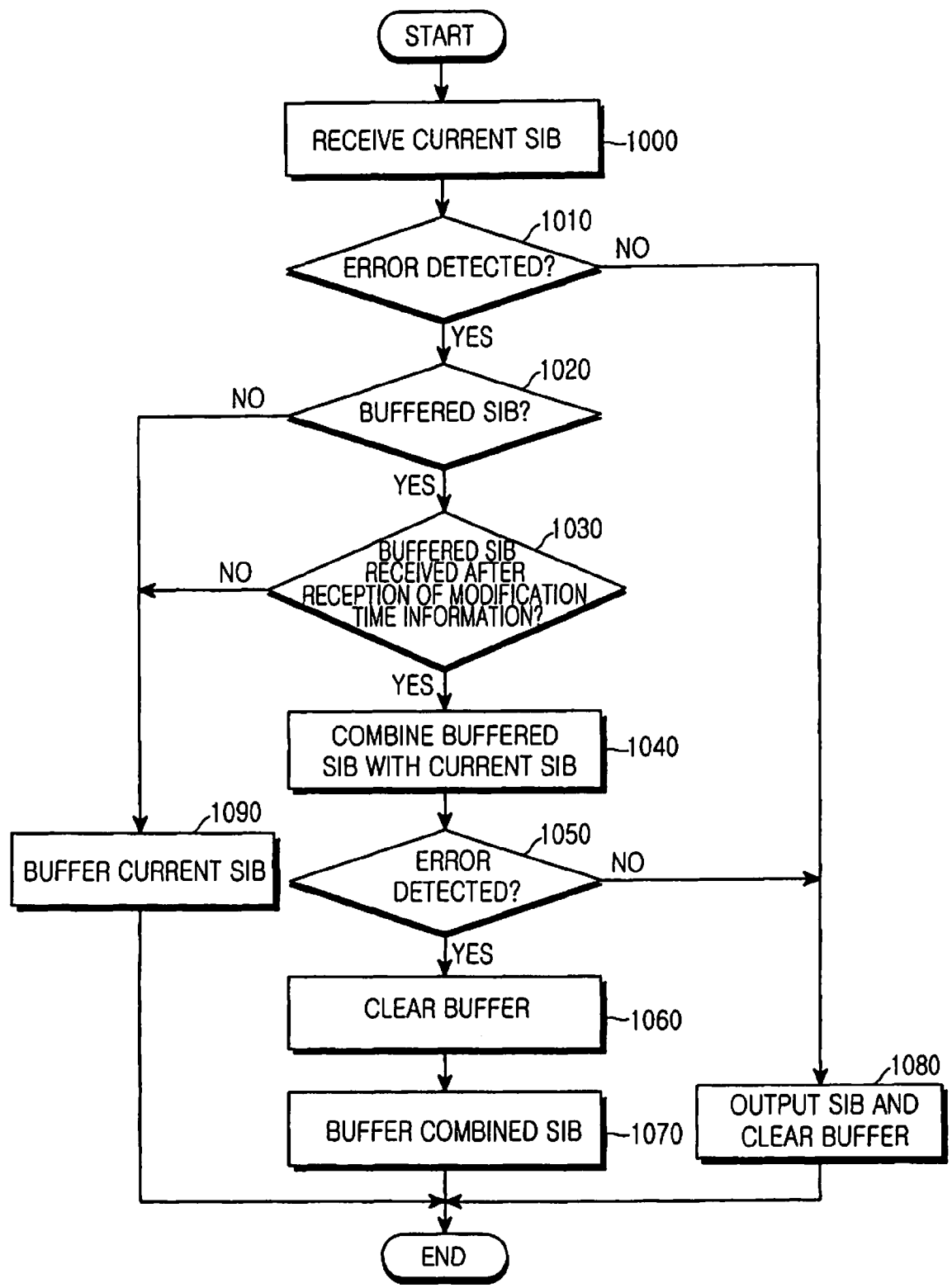
FIG. 10 illustrates an operation for receiving an SIB in the UE according to a fifth embodiment of the present invention.

When an SIB value tag is transmitted separately from an MIB, the UE may fail to receive the SIB value tag due to transmission loss, for example, despite reception of an MIB value tag. FIGS. 9 and 10 describe the instance when the UE fails to receive the SIB value tag.

FIG. 9 illustrates an operation for receiving an SIB in the UE according to a fourth embodiment of the present invention.

Combining condition 4 for the procedure of FIG. 9 is that when the UE does not receive modification time information, a current MIB value tag has a different value from that of a buffered MIB value tag and a current SIB value tag has not been received.

Referring to FIG. 9, the UE receives a current SIB in step 900 and checks for errors in the current SIB in step 910. When the current SIB has an error, the UE proceeds to step 920 and if the current SIB has no errors, the UE jumps to step 960.

Since the current SIB is error-free, it can be immediately applied to the UE. Hence, the current SIB is directly output, without being buffered in the buffer in step 960.

In step 920, the UE determines whether there is a buffered SIB in the buffer. In the presence of a buffered SIB, the UE proceeds to step 930 and in the absence of a buffered SIB, the UE proceeds to step 960. In step 960, since the buffered SIB does not exist in the buffer, the UE buffers the current SIB being the latest SIB in the buffer.

In step 930, the UE combines the current SIB with the buffered SIB. The UE checks for errors in the combined SIB in step 940. If no errors are detected from the combined SIB, the UE outputs the combined SIB without buffering it in step 970. If an error is detected in the combined SIB, the UE clears the buffered SIB from the buffer in step 950 and buffers the current SIB in step 960. The UE does not buffer the combined SIB in step 960, because the UE cannot identify an SIB having changed system information among a plurality of SIBs if the UE has not received the SIB value tag. Thus, when the combined SIB has an error, this implies that the current SIB can be different from the buffered SIB. Thus, the erroneous combined SIB is discarded and instead, the current SIB having the latest system information is buffered in the buffer.

FIG. 10 illustrates an operation for receiving an SIB in the UE according to a fifth embodiment of the present invention.

Combining condition 5 for the procedure of FIG. 10 is that when the UE receives modification time information, a current MIB value tag has a different value from that of a buffered MIB value tag and a buffered SIB was received after a modification time.

In FIG. 10, the UE receives a changed MIB value tag and receives an SIB value tag after receiving an SIB. As previously stated, the UE receives modification time information.

Referring to FIG. 10, the UE receives a current SIB in step 1000 and checks for errors in the current SIB in step 1010. When the current SIB has an error, the UE proceeds to step 1020 and if the current SIB has no errors, the UE jumps to step 1080.

Since the current SIB is error-free, it can be immediately applied to the UE. Hence, the current SIB is directly output, without being buffered in the buffer in step 1080.

In step 1020, the UE determines whether there is a buffered SIB in the buffer. In the presence of a buffered SIB, the UE proceeds to step 1030 and in the absence of a buffered SIB, the UE goes to step 1090.

In step 1090, since the buffered SIB does not exist in the buffer or if any, the buffered SIB was received before a modification time, the UE buffers the current SIB being the latest SIB in the buffer.

In step 1040, the UE combines the current SIB with the buffered SIB. The UE checks for errors in the combined SIB in step 1050. If no errors are detected from the combined SIB, the UE outputs the combined SIB without buffering it in step 1080. If an error is detected in the combined SIB, the UE clears the buffered SIB from the buffer in step 1060 and buffers the combined SIB in step 1070.

As is apparent from the above description, the present invention advantageously increases the reception success rate of an SIB through combining in a UE, even though the SIB received from an ENB has an error in a mobile communication system. Also, when the UE receives an SIB from an ENB, for operation, the present invention decreases a reception time delay.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for receiving system information from a Base Station (BS) in a Mobile Station (MS) in a mobile communication system, comprising:
   determining whether there is buffered system information in a buffer, if current system information has an error;
   determining whether a combining condition is satisfied, in the presence of the buffered system information, the combining condition being defined by at least one of a Master Information Block (MIB) value tag, a System Information Block (SIB) value tag, and modification time information that are associated with the current system information; and
   combining the current system information with the buffered system information, if the combining condition is satisfied.

2. The method of claim 1, wherein the combining condition is that the MIB value tag has a value that has not changed.

3. The method of claim 1, wherein the combining condition is that if the MS does not receive the modification time information, the MIB value tag has a changed value and the SIB value tag has a value that has not changed.

4. The method of claim 1, wherein the combining condition is that if the MS receives the modification time information, the MIB value tag has a changed value, the buffered system information was received after a modification time, and the SIB value tag has a value that has not changed.

5. The method of claim 1, wherein the combining condition is that if the MS receives the modification time information and has not received the SIB value tag, the MIB value tag has a changed value and the buffered system information was received after a modification time.

6. The method of claim 1, further comprising clearing the buffered system information from the buffer and buffering the combined system information in the buffer, if the combined system information has an error.

7. The method of claim 1, wherein the combining condition is that if the MS does not receive the modification time information and has not received the SIB value tag, the MIB value tag has a changed value.

8. The method of claim 7, further comprising clearing the buffered system information from the buffer and buffering the current system information in the buffer, if the combined system information has an error.

9. An apparatus for receiving system information from a Base Station (BS) in a Mobile Station (MS) in a mobile communication system, comprising:
  a receiver for receiving system information and at least one of a Master Information Block (MIB) value tag, a System Information Block (SIB) value tag, and modification time information that are associated with the system information;
  an error checker for checking for errors in the received system information and outputting an error check result;
  a controller for providing the system information to one of a buffer and a combiner according to whether a combining condition or a buffering condition is satisfied based on the error check result, the combining condition and the buffering condition being defined by at least one of the MIB value tag, the SIB value tag and the modification time information;
  the buffer for buffering the system information received from the controller, if the buffering condition is satisfied; and
  the combiner for combining system information buffered in the buffer with the system information received from the controller, if the combining condition is satisfied.

10. The apparatus of claim 9, wherein the combining condition is that the MIB value tag has a value that has not changed.

11. The apparatus of claim 9, wherein the combining condition is that if the receiver does not receive the modification time information, the MIB value tag has a changed value and the SIB value tag has a value that has not changed.

12. The apparatus of claim 9, wherein the combining condition is that if the receiver receives the modification time information, the MIB value tag has a changed value, the buffered system information was received after a modification time, and the SIB value tag has a value that has not changed.

13. The apparatus of claim 9, wherein the combining condition is that if the MS receives the modification time information and has not received the SIB value tag, the MIB value tag has a changed value and the buffered system information was received after a modification time.

14. The apparatus of claim 9, wherein if the combined system information has an error, the controller clears buffered system information from the buffer and buffers the combined system information in the buffer.

15. The apparatus of claim 9, wherein the combining condition is that if the receiver does not receive the modification time information and has not received the SIB value tag, the MIB value tag has a changed value.

16. The apparatus of claim 15, wherein if the combined system information has an error, the controller clears the buffered system information from the buffer and buffers the current system information in the buffer.

* * * * *